(12) United States Patent
Mitchem (10) Patent No.: US 8,978,978 B2
(45) Date of Patent: Mar. 17, 2015

(54) SYSTEMS, METHODS AND COMPUTER PROGRAM PRODUCTS FOR FACILITATING ONLINE GIFT SHOPPING

(75) Inventor: M. Todd Mitchem, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1746 days.

(21) Appl. No.: 11/311,110

(22) Filed: Dec. 19, 2005

(65) Prior Publication Data

US 2007/0143189 A1    Jun. 21, 2007

(51) Int. Cl.
G06K 15/00 (2006.01)
G06Q 30/06 (2012.01)

(52) U.S. Cl.
CPC ............ G06Q 30/06 (2013.01); G06Q 30/0601 (2013.01)
USPC ............................................ 235/383; 705/26

(58) Field of Classification Search
CPC ....... G06Q 30/06; G06Q 20/20; G06Q 30/02; G07G 1/0054; G07G 1/0045
USPC ........................................... 235/383; 705/26
See application file for complete search history.

(56) References Cited

U.S. PATENT DOCUMENTS

| | | | |
|---|---|---|---|
| 5,970,474 A | 10/1999 | LeRoy et al. | |
| 6,240,397 B1 | 5/2001 | Sachs | |
| 6,473,738 B1 | 10/2002 | Garrett | |
| 6,609,106 B1 | 8/2003 | Robertson | |
| 6,611,814 B1 | 8/2003 | Lee et al. | |
| 6,618,753 B2 | 9/2003 | Holland et al. | |
| 6,633,849 B1 | 10/2003 | Dodd | |
| 6,865,546 B1 * | 3/2005 | Song | 705/7.18 |
| 6,873,967 B1 | 3/2005 | Kalagnanam et al. | |
| 2002/0049811 A1 * | 4/2002 | Sakai et al. | 709/204 |
| 2002/0095298 A1 * | 7/2002 | Ewing | 705/1 |
| 2002/0178089 A1 | 11/2002 | Bezos et al. | |
| 2003/0028451 A1 | 2/2003 | Ananian | |
| 2003/0093327 A1 | 5/2003 | Roberts et al. | |
| 2003/0105682 A1 | 6/2003 | Dicker et al. | |
| 2004/0030604 A1 | 2/2004 | Young | |
| 2004/0199432 A1 * | 10/2004 | Iwase et al. | 705/26 |
| 2006/0069627 A1 * | 3/2006 | Petersen et al. | 705/27 |

FOREIGN PATENT DOCUMENTS

WO    WO 0180159 A1 * 10/2001

* cited by examiner

*Primary Examiner* — Rafferty Kelly
(74) *Attorney, Agent, or Firm* — Scott P. Zimmerman, PLLC (57) ABSTRACT

According to embodiments of the present invention, a method for facilitating online gift shopping includes: receiving an order for a gift for a recipient from an online shopper via a computer network; providing a gift notice for the recipient to inform the recipient that the gift has been ordered for the recipient; receiving a reply to the gift notice from the recipient via the computer network, wherein the reply includes gift feedback information; and updating a recipient profile responsive to the reply and based on the gift feedback information from the recipient, wherein the recipient profile is associated with the recipient. Computer program products and systems for facilitating online gift shopping are also provided.

18 Claims, 6 Drawing Sheets

SYSTEMS, METHODS AND COMPUTER PROGRAM PRODUCTS FOR FACILITATING ONLINE GIFT SHOPPING

FIELD OF THE INVENTION

The present invention relates generally to computer systems, methods and computer program products and, more particularly, to electronic commerce conducted via computer networks.

BACKGROUND OF THE INVENTION

Gift shoppers are increasingly turning to online retailers, vendors and stores such as Amazon.com. Generally, gift shoppers wish to give a gift recipient a gift the recipient would like or prefer. However, sometimes a gift shopper may be uncertain as to what gifts a recipient may want. As such, the gift shopper risks giving the recipient a gift the recipient does not want or cannot use. In this case, the recipient may return the gift to the vendor, which may entail expense or inconvenience.

SUMMARY OF THE INVENTION

According to embodiments of the present invention, a method for facilitating online gift shopping includes: receiving an order for a gift for a recipient from an online shopper via a computer network; providing a gift notice for the recipient to inform the recipient that the gift has been ordered for the recipient; receiving a reply to the gift notice from the recipient via the computer network, wherein the reply includes gift feedback information; and updating a recipient profile responsive to the reply and based on the gift feedback information from the recipient, wherein the recipient profile is associated with the recipient.

According to embodiments, providing a gift notice for the recipient includes sending the gift notice to the recipient via the computer network to inform the recipient that the gift has been ordered for the recipient. The gift feedback information may include gift attribute information and updating the recipient profile responsive to the reply and based on the gift feedback information may include updating the recipient profile based on the gift attribute information.

According to further embodiments of the present invention, a computer program product for facilitating online gift shopping includes a computer usable medium having computer usable program code embodied therein, the computer usable program code including: computer usable program code configured to receive an order for a gift for a recipient from an online shopper via a computer network; computer usable program code configured to provide a gift notice for the recipient to inform the recipient that the gift has been ordered for the recipient; computer usable program code configured to receive a reply to the gift notice from the recipient via the computer network, wherein the reply includes gift feedback information; and computer usable program code configured to update a recipient profile responsive to the reply and based on the gift feedback information from the recipient, wherein the recipient profile is associated with the recipient.

According to further embodiments of the present invention, a system for facilitating online gift shopping includes at least one application server configured to: receive an order for a gift for a recipient from an online shopper via a computer network; provide a gift notice for the recipient to inform the recipient that the gift has been ordered for the recipient; receive a reply to the gift notice from the recipient via the computer network, wherein the reply includes gift feedback information; and update a recipient profile responsive to the reply and based on the gift feedback information from the recipient, wherein the recipient profile is associated with the recipient.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF THE EMBODIMENTS OF THE INVENTION

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Well-known functions or configurations may not be described in detail for brevity and/or clarity.

A communications network with which the present invention may be utilized is the Internet. The Internet is a worldwide decentralized network of computers having the ability to communicate with each other. The Internet has gained broad recognition as a viable medium for communicating and for conducting business. The World-Wide Web (Web) is comprised of server-hosting computers (Web servers) connected to the Internet that have hypertext documents (referred to as Web pages) stored therewithin. Web pages are accessible by client programs (e.g., Web browsers) utilizing the Hypertext Transfer Protocol (HTTP) via a Transmission Control Protocol/Internet Protocol (TCP/IP) connection between a client-hosting device and a server-hosting device, and/or between wireless client/devices and Wireless Application Protocol (WAP) server devices. While HTTP and Web pages are the prevalent forms for the Web, the Web itself refers to a wide range of protocols including Secure Hypertext Transfer Protocol (HTTPS), File Transfer Protocol (FTP), and Gopher, and Web content formats including plain text, HyperText Markup Language (HTML), Extensible Markup Language (XML), Wireless Markup Language (WML), as well as image formats such as Graphics Interchange Format (GIF) and Joint Photographic Experts Group (JPEG).

A Web site is conventionally a related collection of Web files that includes a beginning file called a "home" page. From the home page, a visitor can access other files and applications at a Web site. A large Web site may utilize a number of servers, which may or may not be different and which may or may not be geographically-dispersed. A Web server (also referred to as an HTTP server) is a computer program that utilizes HTTP to serve files that form Web pages to requesting Web clients. Exemplary Web servers include International Business Machines Corporation's family of Lotus Domino® servers, the Apache server (available from apache.org), and Microsoft's Internet Information Server (IIS), available from Microsoft Corporation, Redmond, Wash. A Web client is a requesting program that also utilizes HTTP. A browser is an exemplary Web client for use in requesting Web pages and files from Web servers. A Web server waits for a Web client, such as a browser, to open a connection and to request a specific Web page or application. The Web server then sends a copy of the requested item to the Web client, closes the connection with the Web client, and waits for the next connection.

HTTP allows a browser to request a specific item, which a Web server then returns and the browser renders within a display screen. To ensure that browsers and Web servers can interoperate unambiguously, HTTP defines the exact format of requests (HTTP requests) sent from a browser to a Web server as well as the format of responses (HTTP responses) that a Web server returns to a browser. Exemplary browsers that can be utilized by users accessing a Web site according to the present invention include, but are not limited to, Netscape Navigator® (America Online, Inc., Dulles, Va.) and Internet Explorer™ (Microsoft Corporation, Redmond, Wash.). Browsers typically provide a graphical user interface for retrieving and viewing Web pages, applications, and other resources served by Web servers.

As is known to those skilled in this art, a Web page is conventionally formatted via a standard page description language such as HTML, which typically contains text and can reference graphics, sound, animation, and video data. HTML provides for basic document formatting and allows a Web content provider to specify anchors or hypertext links (typically manifested as highlighted text) to other servers. When a user selects (i.e., activates) a particular hypertext link, a browser running on the user's client device reads and interprets an address, called a Uniform Resource Locator (URL) associated with the hypertext link, connects the browser with a Web server at that address, and makes a request (e.g., an HTTP request) for the file identified in the hypertext link. The Web server then sends the requested file to the client device, which the browser interprets and renders within a display screen.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language or compiled Basic (CBASIC), or in a functional (or fourth generation) programming language such as Lisp, SML, or Forth. Furthermore, some modules or routines may be written in assembly language or even microcode to enhance performance and/or memory usage. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to an embodiment of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

Accordingly, steps of the flow chart illustrations and blocks of the block diagrams support combinations of means for performing the specified functions, combinations of steps for performing the specified functions and program instruction means for performing the specified function. It will also be understood that each step of the flow chart illustrations, and combinations of steps in the flow chart illustrations, can be implemented by special purpose hardware based computer systems which perform the specified functions or steps, or combinations of special purpose hardware and computer instructions.

Figure 1:
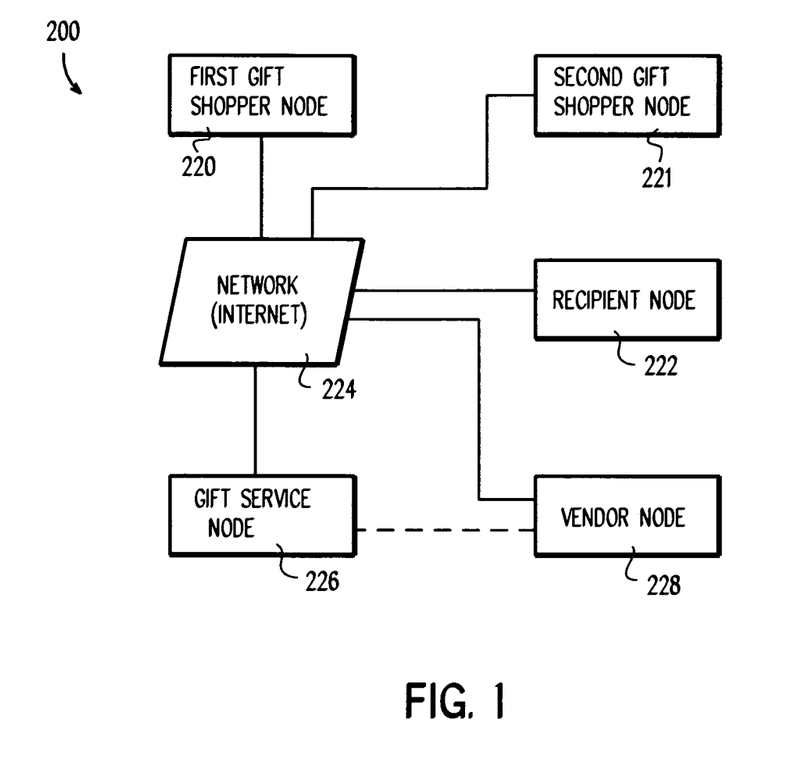
FIG. 1 is a block diagram of a system suitable for use with embodiments of the present invention.

Referring now to FIG. 1, a system suitable 200 for use with various embodiments of the present invention is illustrated. As seen in FIG. 1, a first gift shopper web client data processing system (or first gift shopper node) 220, a second web client data processing system (or second gift shopper node) 221, and a gift recipient web client data processing system (or recipient node) 222 may communicate over a data communication network 224 with an e-commerce server (or gift service node) 226. The e-commerce server may provide Web pages, applets or other such programs to the web clients 220, 221, 222 over the network 224. The system 200 may further include a vendor server or node 228 that communicates with the gift service node 226 via the network 224 and/or an alternative link (e.g., a virtual private network). The network 224 may be the Internet or an intranet or a combination of the two and may include various types of communications including communications over telephone lines, wireless communications, local area network (LAN) or wide area network (WAN) communications or the like.

In operation, the e-commerce server 226 provides a Web page containing images adapted to instruct and solicit information and instructions from a customer. The web clients 220, 221, 222, display the Web pages and a user selects options and provides information through selective manipulation of buttons and the like and entry of data into selected fields.

The e-commerce server 226 may provide to a web client 220, 221, 222 browser interpretable pages such as HTML pages, dynamic HTML (DHTML) pages or Extensible Markup Language (XML) pages which may display information for on-line transactions. As will be appreciated by those of skill in the art, the web client 220, 221, 222 may be any user workstation or device capable of rendering the browser interpretable pages such as, for example, a personal computer or a network computer or even pervasive computing devices such as a personal data assistant (PDA) or a smartphone. Furthermore, the term browser is used herein to refer to any application, program, hardware or other device that may interpret and display a browser interpretable page such as an HTML or XML page. Accordingly, the present invention should not be construed as limited to any particular workstation or browser implementation. Furthermore, the present invention may be applicable to a number of different architectures and, thus, should not be construed as limited to the particular configuration illustrated in FIG. 1, but may be utilized with any configuration suitable for carrying out the operations described herein.

Figure 2:
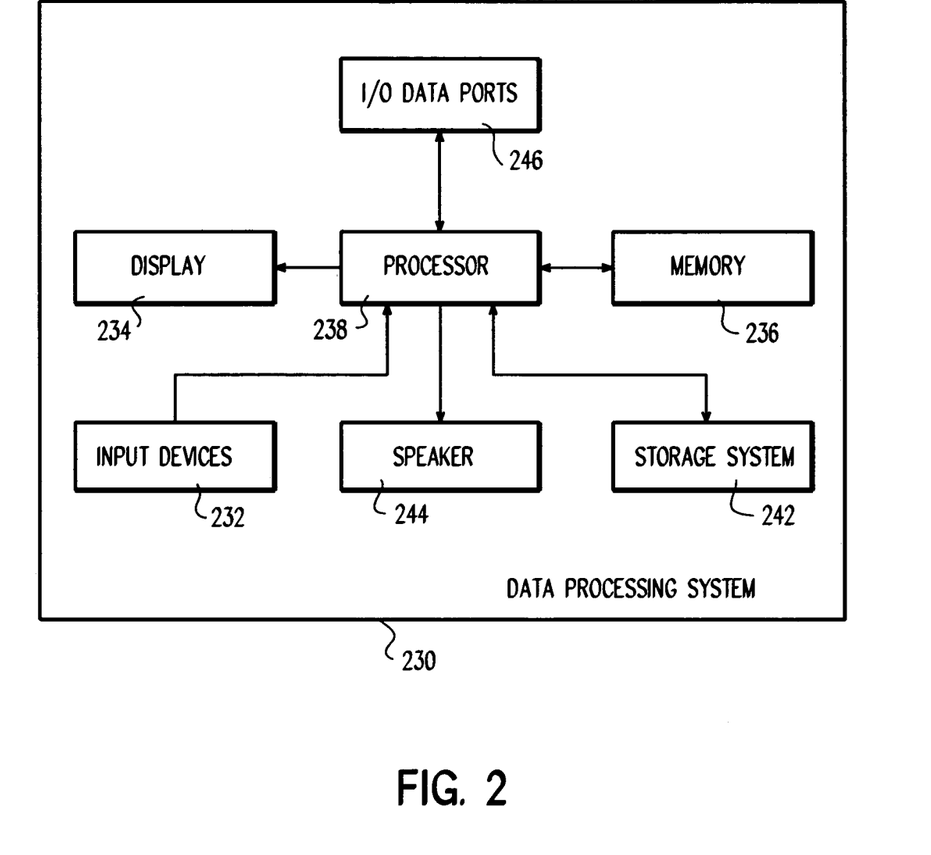
FIG. 2 is a block diagram of data processing systems according to embodiments of the present invention.

Referring now to FIG. 2, an exemplary embodiment of a data processing system 230 suitable for use as the web client 220, the web client 221, the web client 222, and/or the e-commerce server 226 in accordance with embodiments of the present invention is illustrated and may include input device(s) 232 such as a keyboard or keypad, a display 234, and a memory 236 that communicate with a processor 238. The data processing system 230 may further include a storage system 242, a speaker 244 and an I/O data port(s) 246 that also communicate with the processor 238. The storage system 242 may include removable and/or fixed media such as floppy disks, ZIP drives, hard disks or the like as well as virtual storage such as a RAMDISK. The I/O data port 246 can be used to transfer information between the data processing system 230 and another computer system or a network (e.g., the Internet). Such data processing systems may include, for example, personal computers, laptop computers, mainframe computers, pervasive computing devices such as personal digital assistants, smartphones or the like, or even embedded processing systems. The components of a particular data processing system may be conventional or custom components, such as those used in many conventional computing devices, which may be configured to operate as described herein.

Figure 3:
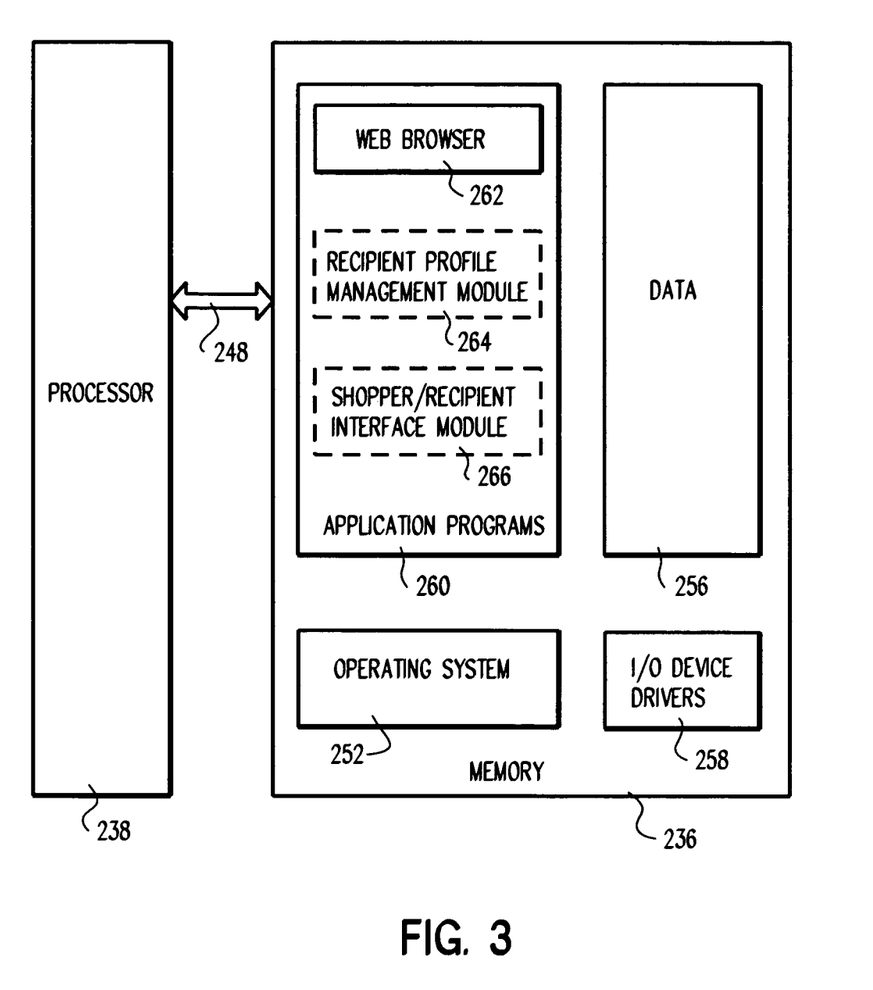
FIG. 3 is a more detailed block diagram of data processing systems according to embodiments of the present invention.

FIG. 3 is a block diagram of data processing systems that illustrate systems, methods, and computer program products in accordance with embodiments of the present invention. The processor 238 communicates with the memory 236 via an address/data bus 248. The processor 238 can be a commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash memory, SRAM, and DRAM.

As shown in FIG. 3, the memory 236 may contain several categories of software and data used in the data processing system 230: the operating system 252; the application program(s) 260; the input/output (I/O) device drivers 258; and the data 256. As will be appreciated by those of skill in the art, the operating system 252 may be any operating system suitable for use with a data processing system, such as OS/2, AIX or OS/390 from International Business Machines Corporation, Armonk, N.Y., WindowsCE, WindowsNT, Windows95, Windows98 or Windows2000 from Microsoft Corporation, Redmond, Wash., PalmOS from Palm, Inc., MacOS from Apple Computer, UNIX or Linux, proprietary operating systems or dedicated operating systems, for example, for embedded data processing systems.

The I/O device drivers 258 typically include software routines accessed through the operating system 252 by the application program 260 to communicate with devices such as the input devices 232, the display 234, the speaker 244, the storage system 242, the I/O data port(s) 246, and certain memory 236 components. The application program(s) 260 is illustrative of the programs that implement the various features of the data processing system 230. Finally, the data 256 represents the static and dynamic data used by the application program(s) 260, operating system 252, I/O device drivers 258, and other software programs that may reside in the memory 236.

As is further seen in FIG. 3, the application program(s) 260 may include a web browser 262. The web browser 262 may be any conventional web browser capable of being configured to carry out the operations described herein. The gift service node 226 may also include a recipient profile management module 264 and a shopper/recipient interface module 266. The recipient profile management module 264 may operate to maintain and update recipient profiles as described herein. The shopper/recipient interface module 266 may operate to interface and exchange data with online gift shopper nodes and recipient nodes as described herein. The present invention should not be construed as limited to the configuration of FIG. 3, but may encompass any suitable architecture, programming language or division of function which may carry out the operations described herein for facilitating online shopping. While the present invention is illustrated, for example, with reference to a web browser 262, as will be appreciated by those of skill in the art, the functions carried out by these modules may also be incorporated into for example, the operating system 252.

Figure 4:
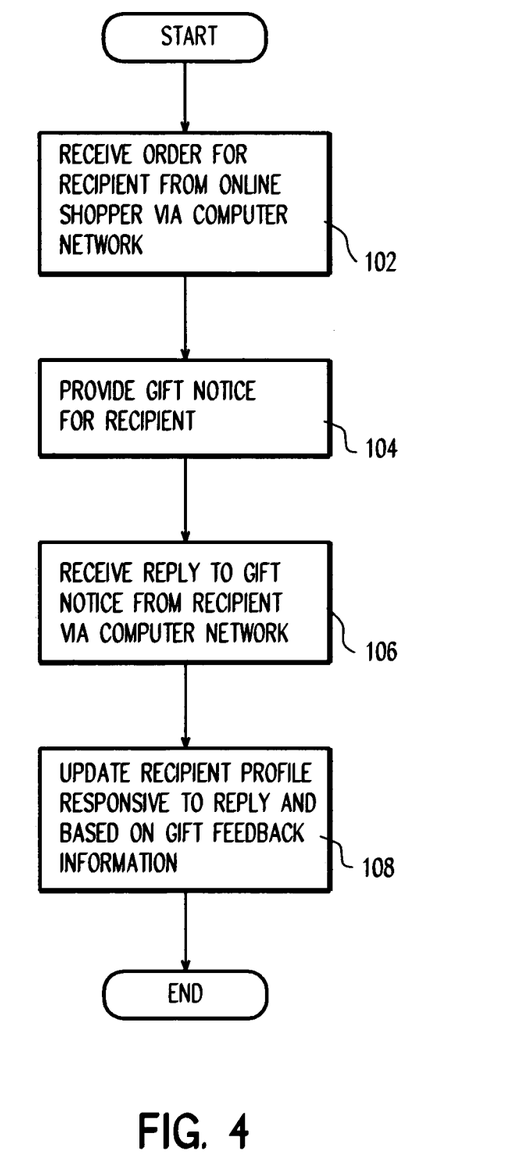
FIG. 4 is a flowchart illustrating operations according to embodiments of the present invention.

Referring now to FIG. 4, a flow chart illustrating operations of the present invention for facilitating online gift shopping will now be described.

According to embodiments of the present invention, an order or electronic request for a gift for a recipient is received from an online gift shopper via a computer network (Block 102). A gift notice is then provided for the recipient to inform the recipient that the gift has been ordered for the recipient (Block 104). According to some embodiments, the gift notice is sent to the recipient via the computer network. A reply to the gift notice is received from the recipient via the computer network (Block 106). The reply includes gift feedback information. A recipient profile is updated responsive to the reply and based on the gift feedback information from the recipient (Block 108). The recipient profile is associated with the recipient.

In general, the gift service node 226 may reply and send messages to the gift shopper and gift recipient by displaying such replies or messages on the appropriate displays of the nodes or servers 220, 221, 222 and/or via other output devices such as speakers, etc. The gift shoppers and recipient may both send replies and messages electronically via the nodes 220, 221, 222. For brevity and clarity, the present disclosure may refer to the gift shoppers or recipient as sending a message or reply to the gift service node 226 or the gift service node 226 sending a reply or message to the gift shoppers or recipient, it being understood that such operations and communications are accomplished via the nodes 220, 221, 222, 226 as appropriate.

Figure 5A:
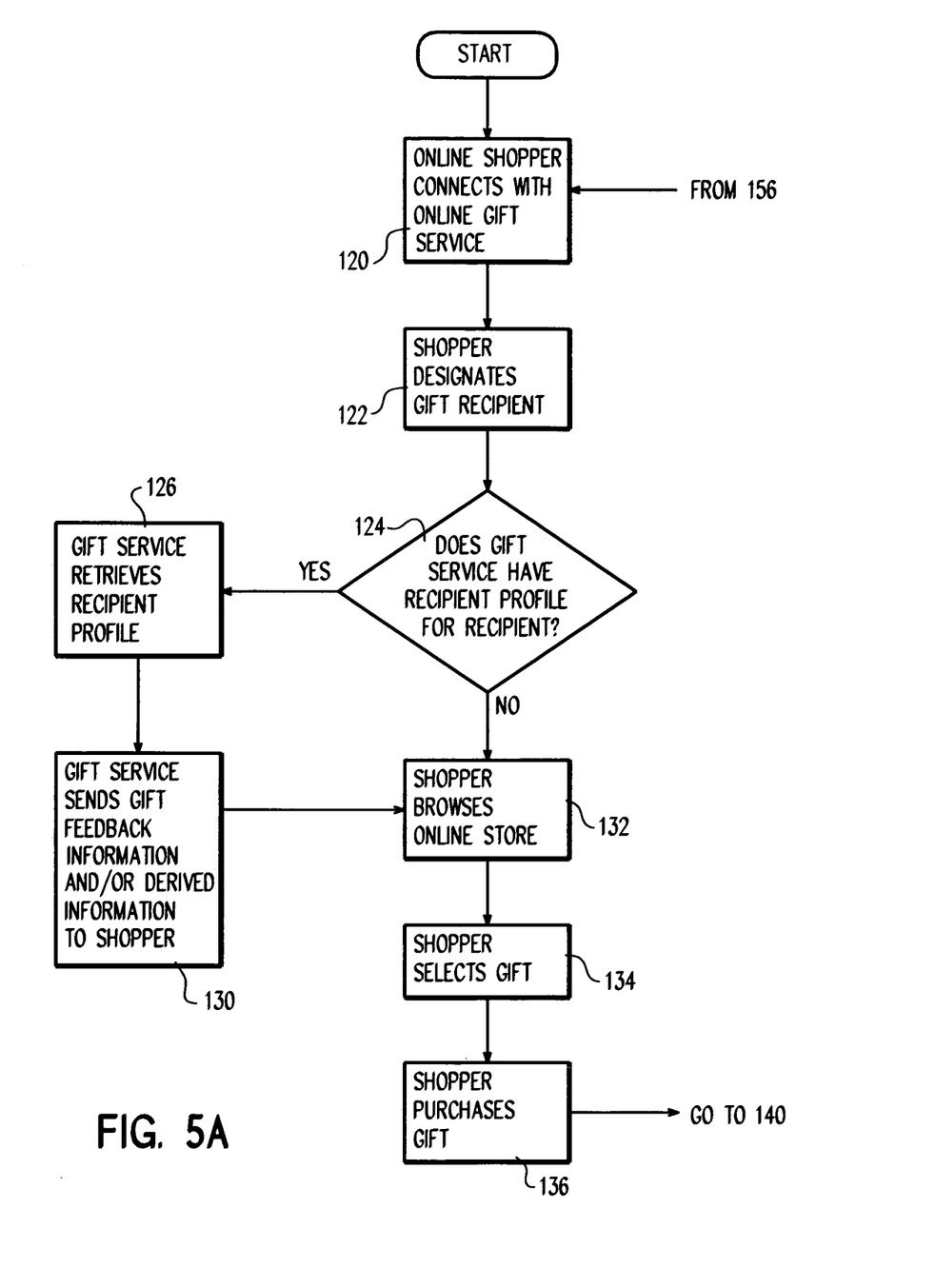
FIGS. 5A and 5B are a flowchart illustrating operations according to further embodiments of the present invention.
Figure 5B:
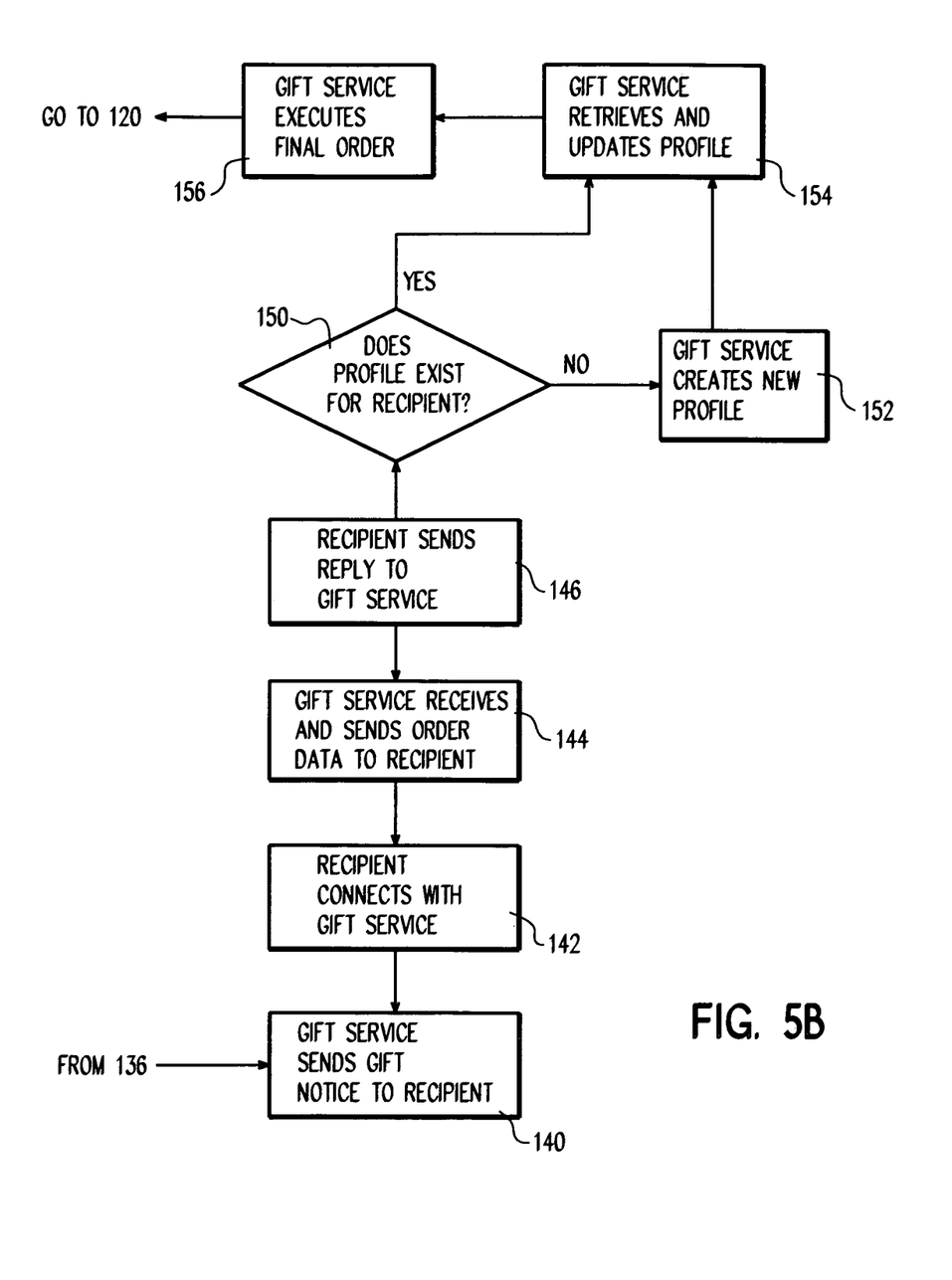

FIGS. 5A and 5B illustrate methods according to more particular embodiments of the present invention, as discussed herein below. It will be appreciated that, in accordance with embodiments of the present invention, various of the steps, criteria, etc. disclosed herein may be omitted, modified, reordered, differently combined, etc.

Referring to FIGS. 5A and 5B, a first sender or online gift shopper using the first gift shopper node 220 connects to the gift service node 226 (provided by the seller) via the network 224 (Block 120).

Optionally, the first shopper may designate a gift recipient to the gift service node 226 (Block 122). In response, the gift service node 226 determines whether the gift service node 226 has a recipient profile for the designated recipient (Block 124). If the gift service node 226 does have a recipient profile for the recipient, the gift service node 226 will retrieve the recipient profile as discussed below with regard to Block 126, and will thereafter process the shopping session as described below with respect to Block 130. If the gift service node 226 does not have a recipient profile for the recipient or the first shopper is not authorized to access the recipient profile, the gift service node 226 will reply to the first shopper that no profile is available for the recipient. Additionally or alternatively, the gift service node 226 may automatically determine whether there exists a recipient profile for the recipient based on contact information, delivery information or other information provided by the shopper without requiring that the shopper request the recipient's information from the profile.

The first shopper may browse through the online store of the gift service node 226 (Block 132), select a gift for the recipient (Block 134), and purchase the gift for the recipient (Block 136). The gift service node 226 may store a record of the purchase including various pertinent gift order data. The steps of Blocks 132-136 may be enabled to execute in any suitable manner. For example, the gift service node 226 may employ a shopping cart and checkout process. The purchasing step may include making payment or a payment arrangement, and providing contact and/or delivery information for the recipient. The contact information may include an electronic mail (e-mail) or instant messaging (IM) address, a pager or cell phone number, etc. The purchasing step may further permit the shopper to submit a gift message that will be relayed to the gift recipient along with the actual gift or a gift notice.

The gift service node 226 then sends a gift notice or alert to the gift recipient via the network 224 and the recipient node 222 to notify the recipient that a gift has been purchased for the recipient and is waiting for shipment until receiving acceptance from the recipient (Block 140). The gift notice may be sent via electronic mail, instant message, or any other suitable mechanism. The gift notice may inform the recipient that a gift has been purchased for the recipient and provide instructions for obtaining the gift and/or retrieving additional information regarding the gift. The gift notice may provide a URL for a website where the retrieval can be transacted.

The recipient then connects with the gift service node 226 via the network 224 using the recipient node 222 (Block 142). The gift service node 226 retrieves the gift order data and sends the same to the recipient node 222, where it is displayed to the recipient (Block 144). According to some embodiments, the gift service node 226 may ask the recipient whether the recipient wishes to receive a gift from the recipient's wish list (if any) in lieu of the purchased gift.

The recipient then sends a reply to the gift service node 226 via the network 224 (Block 146). The reply includes gift feedback information. The gift feedback information may include gift attribute information (as discussed below) and/or other gift related information (referred to herein as ancillary information). The gift attribute information may include gift selection information and/or gift criteria information. The gift feedback information may be sent from the recipient to the gift service node 226 in multiple replies and responsive to further inquiries sent to the recipient by the gift service node 226.

The ancillary information (i.e., other than the gift attribute information), if any, may include one or more of the following: a revision to the gift delivery address from the recipient (which may include an entirely new address); a request to defer delivery of the gift; a request to expedite delivery of the gift (which may be accompanied by payment from the recipient); a request to deliver the gift to a different recipient; and a request to send a thank you note from the recipient to the gift shopper (the thank you note may be composed by the recipient). The foregoing list is not intended to be exhaustive of the types and examples of ancillary information that may be included in the gift feedback information.

The gift selection information, if any, may include one or more of the following: an acceptance of the gift without modification; an acceptance of the gift with modification; a rejection of the gift paired with a request for an alternative gift; a rejection of the gift paired with a request for a store credit redeemable with the gift service or a vendor; an acceptance or rejection of the present and all future gifts from the gift shopper who sent the gift; and an acceptance or rejection of the present and all future gifts from all gift givers from the gift service.

The gift criteria information, if any, may include various information directly or indirectly indicative of the criteria that may be advantageously employed to select a preferred or appropriate gift for the recipient in the future.

The gift criteria information may include recipient biographical information such as the recipient's age, gender, favorite color, size, etc. The biographical information may include, for example, information indicative of types of gifts the recipient may employ. For example, the recipient may indicate whether the recipient owns a DVD player, has children or pets, etc.

The gift criteria information may include wish list request information whereby the recipient identifies potential gift items or features the recipient wants the gift service to add to a wish list maintained by the gift service for the recipient. This may be accomplished by the recipient browsing the online store of the gift service node 226, selecting an item, and requesting that the item be added to the wish list. Additionally or alternatively, the recipient may designate gift features wished for, such as gift types, gift brands, gift colors, etc. For example, the recipient may indicate that the recipient wishes to receive movies in the DVD format, comedy movies, hip-hop genre music, etc.

The gift criteria information may include reverse wish list information whereby the recipient identifies potential gift items or features the recipient wants the gift service to add to a reverse wish list maintained by the gift service for the recipient. The reverse wish list represents the gift items and features the recipient does not want. The recipient may indicate types, brands, colors, etc. of gifts that the recipient does not want. For example, the recipient may indicate that the recipient does not want to receive videos in the VHS format, horror movies, classical music, etc.

According to some embodiments, the reverse wish list information includes a request not to receive any categorized or rated items of a certain type having a rating exceeding (i.e., more mature) than a given category or rating. According to some embodiments, the reverse wish list information includes a request not to include any movies having a given rating (e.g., "R" rating) or any more mature rating. According to some embodiments, the reverse wish list information includes a request not to include any music or video games having a parental advisory designation having or exceeding a given rating (e.g., "explicit lyrics").

According to some embodiments, the gift criteria information includes a request for a third party approval feature to be associated with the recipient. In this case, a gift purchased for the recipient must first be approved by a third party before it can be accepted by the recipient. According to some embodiments, the approved gift can be accepted by the third party on the recipient's behalf. According to some embodiments, the third party is a parent or guardian of the recipient. The third party approval feature may be applied to all gifts, gifts of selected types (e.g., movies, music and video games), or categorized/rated gifts having ratings outside a pre-designated permitted rating range. For example, the recipient (or the recipient's parent/guardian), who may be a child, may send a request to the gift service node 226 that, in the event the recipient receives a gift that is an "R"-rated movie, a gift notice is first sent to the guardian (e.g., via e-mail) and cannot be accepted by the recipient until the guardian replies to the gift service node 226 (e.g., via the network 224) with the guardian's approval.

The gift service node 226 determines whether a recipient profile exists for the recipient in the gift service (Block 150). If so, the gift service node 226 retrieves the existing recipient profile. If not, the gift service node 226 creates a new recipient profile (Block 152).

Responsive to the reply from the recipient, the gift service node 226 then updates the recipient profile associated with the recipient based on the gift feedback information (Block 154). The recipient profile is a data record correlated or designated as corresponding to the recipient and including various data. Data of the recipient profile may include information provided by the recipient, the first gift shopper, a previous gift shopper, recipient's previous shopping habits or another source or sources.

Updating the recipient profile may include revising the recipient profile to incorporate the ancillary information, if any. For example, the recipient's contact or delivery address may be revised in accordance with the recipient's instructions.

Updating the recipient profile may include revising the recipient profile to incorporate the gift attribute information, if any. The update may be based on the gift criteria information, if any, and/or the gift selection information, if any, and may be directly or indirectly incorporated as discussed below.

The update may include creating or updating a record of the gifts rejected and/or accepted by the recipient based on the gift selection information. The recipient profile may be updated to indicate executable instructions from the recipient (e.g., automatically accept all gifts from a given gift sender).

The update may include revising a record of the recipient's biographical information to incorporate the biographical information provided in the recipient's reply. For example, the profile may be revised to indicate that the recipient is a certain age and has a DVD player.

The update may include creating or revising a wish list associated with the recipient to add the requested gift items and/or gift features. Likewise, the update may include creating or revising a reverse wish list associated with the recipient to add the indicated advance rejected gift items and/or gift features. Furthermore, the update may include indicating that a request for a third party approval (e.g., by a guardian) is associated with the recipient profile, and setting the appropriate conditions.

The foregoing updates may directly incorporate the gift feedback information into the recipient profile. That is, the various information is directly reflected in the recipient profile. The gift service node 226 may also indirectly incorporate the gift feedback information into the recipient profile. More particularly, the gift service node 226 may determine or automatically generate certain derived or projected information from the gift feedback information and incorporate the derived information into the recipient profile.

The derived information may be based on the gift selection information. The gift service node 226 may determine that, based on the recipient's pattern of rejecting certain items (e.g., DVDs), these items and like items are likely to be rejected by the recipient in the future. In this case, the gift service node 226 may add the rejected items or type of item to a "likely to be rejected gifts" list. Additionally, the gift service node 226 may add the rejected items to a "rejected gifts" list as a record of previously rejected gifts. The gift service node 226 may also determine gifts for the "likely to be rejected gifts" list based on biographical information and/or gift criteria information provided in the gift feedback information. For example, if the recipient indicated that the recipient does not have a DVD player, the gift service node 226 may add DVDs to the "likely to be rejected gifts" list.

Similarly, based on a pattern of acceptance of gifts of a certain type, the gift service node 226 may determine that items of this type are likely to be accepted by the recipient in the future. In this case, the gift service node 226 may add the rejected items or type of item to a "recommended gifts" list. The gift service node 226 may also determine gifts for the "recommended gifts" list based on biographical information and/or gift criteria information provided in the gift feedback information. For example, if the recipient indicated that the recipient has a DVD player, the gift service node 226 may add DVDs to the "recommended gifts" list. Moreover, the "recommended gifts" list may be updated based on the acceptance of certain gifts. For example, if the present gift is a DVD player and the recipient accepts the gift, the gift service node 226 may add DVDs to the "recommended gifts" list.

The gift service node 226 may also execute the final order in accordance with the recipient's instructions (Block 156). For example, the gift service node 226 may execute the order via a gift delivery and fulfillment process. Thus, if the recipient accepts the gift, the gift service node 226 will initiate the process to effect fulfillment of the order by delivery of an actual gift corresponding to the gift. Delivery may include physical delivery and/or effective delivery, such as by the establishment of credit with a vendor or providing the actual gift at a location for pick-up by the recipient. Likewise, if the gift is modified, an alternate gift is selected, etc., the gift service node 226 will fulfill the revised order. Fulfillment of the order may be executed by an outside vendor, in which case the gift service node 226 may forward a fulfillment request or the like to the vendor node 228. If the gift is rejected and a credit is requested, the gift service node 226 may register a credit with the gift service or send a credit request to the vendor node 228. If the gift is rejected without request for alternative accommodation, the gift service node 226 may inform the first shopper of the same, and offer an alternative disposition of the purchase request (e.g., refund, credit, alternate gift, etc). Various suitable methods, configurations, and techniques for executing the acceptance/rejection requests are known to those of skill in the art, and therefore will not be discussed in further detail herein.

For the purposes of illustration and returning to Block 120 of FIG. 5, a second online gift shopper (which may be the same as the first online gift shopper) subsequently connects with the gift service node 226 via the network 224 and the second gift shopper node 221 in the same manner as discussed above for the first gift shopper. The second online gift shopper designates the gift recipient (Block 122). The gift service node 226 determines that a recipient profile exists for the recipient (Block 124) and retrieves the recipient profile (Block 126).

The gift service node 226 may thereafter send some or all of the gift feedback information or derived information based on the gift feedback information to the second gift shopper (Block 130). According to some embodiments, the information is displayed on the second gift shopper node 221. Accordingly, the gift service node 226 may display to the second shopper one or more of the following, in whole or in part: the recipient's wish list; the recipient's reverse wish list; the recipient's previously rejected gifts list; the recipient's previously accepted gifts list; the "likely to be rejected gifts" list derived for the recipient; the "recommended gifts" list derived for the recipient; the recipient's biographical information; the recipient's ancillary information; and the designation of the third party approval feature, if applicable.

Some or all of the information may be sent and displayed automatically in response to the designation of the recipient by the second gift shopper, in response to a subsequent response from the second gift shopper for information regarding the recipient or recommended gifts, and/or in response to the second shopper viewing, selecting or attempting to purchase certain items or types of items. For example, according to some embodiments, the "likely to be rejected gifts" list, the previously rejected gifts list, and/or the previously accepted gifts list are not automatically displayed to the second shopper. Instead, these lists or information therefrom are displayed in response to requests from the second shopper. For example, if the second shopper requests to view or to select (for purchase or shopping cart) an item that the recipient has previously accepted, the gift service node 226 will inform the second shopper of the same. Likewise, if the second shopper requests to view or select an item that the recipient has previously rejected, the gift service node 226 will inform the second shopper of the same. Moreover, the second shopper may ask the gift service node 226 whether, based on the recipient profile, the recipient already has a certain gift that is contemplated for purchase by the second shopper.

Similarly, if the second shopper requests to view or select an item that the gift service node 226 has added to the "likely to be rejected gifts" list or appears on the recipient's reverse wish list, the gift service node 226 may inform the second shopper of such. By way of example, the gift service node 226 may report to the second shopper "This person does not accept 'R'-rated movies" in response to an attempt to purchase an "R"-rated movie for the recipient. By way of further example, the gift service node 226 may report to the second shopper "This person does not have a DVD player" in response to an attempt to purchase a DVD for the recipient where the recipient gift feedback information (and, hence, recipient profile) indicated that the recipient did not own a DVD player.

The procedure and handling of the second shopper may otherwise be carried out as described above with regard to Blocks 132-156 so that the method provides a continuing feedback loop for updating the recipient's profile.

In lieu of or in addition to sending the recipient a gift notice electronically via the network 224, the gift service node 226 may send (e.g., electronically or otherwise) the gift shopper a receipt or voucher for presentation to the recipient. The voucher may include information or instructions for connecting to the gift service node 226 to retrieve and modify the gift as described herein. The voucher may also include other order information, an identification of the giver/shopper, an identification of and/or other information regarding the gift item, a graphical depiction (e.g., photograph) of the gift item, and/or other pertinent information.

According to further embodiments, the gift service node 226 may determine an online advertisement appropriate for the recipient based on the recipient's profile and display the advertisement to the recipient. According to some embodiments, the determination is based on the recipient's history of gift acceptance and/or rejection. The advertisement may also be an advertisement or offer shipped with the gift. The online advertisement may also be a banner advertisement for a third party other than the online retailer or may be suggestions for items for the recipient to purchase from the online retailer.

According to further embodiments, the online gift shopper may request that the gift service node 226 send the gift notice and/or the actual gift to whatever address or addresses are in the recipient's profile. According to some embodiments, if an address provided by the shopper does not match the corresponding address in a recipient's profile, the gift service node 226 will notify the shopper of the mismatch.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

That which is claimed is:

1. A, comprising:
   receiving, at a server, an order for a gift for a recipient selected by an online shopper via a computer network, the order comprising a cellular telephone number of a device associated with the recipient of the gift;
   querying, by the server, a profile database for the recipient;
   retrieving, by the server, a profile from the profile database that is associated with the recipient;
   retrieving, from the profile, a list of devices associated with the recipient;
   comparing, by the server, the order for the gift to the list of devices associated with the recipient;
   determining, by the server, the gift is compatible with one device in the list of devices associated with the recipient;
   recommending, by the server, the gift in response to determining the gift is compatible with the list of devices associated with the recipient; and
   sending, from the server, a gift notice to the cellular telephone number to inform the recipient that the gift has been ordered for the recipient.

2. The method of claim 1, further comprising determining the gift is incompatible with the list of devices associated with the recipient.

3. The method of claim 1, further comprising receiving a request for a thank you note from the recipient to the online shopper.

4. The method of claim 1, further comprising receiving a reply from the recipient.

5. The method of claim 1, further comprising receiving, from the recipient, a rejection of the gift.

6. The method of claim 1, further comprising receiving, from the recipient, a rejection of all gifts from the online shopper.

7. The method of claim 1, further comprising determining, from the list of devices associated with the recipient, that the recipient will accept the gift.

8. The method of claim 1, further comprising requiring a third party approval for the gift.

9. The method of claim 1, further comprising updating the profile of the recipient.

10. The method of claim 1, further comprising retrieving a list of recommended gifts associated with the recipient.

11. The method of claim 1, further comprising processing the order for the gift.

12. The method of claim 1, further comprising receiving a request for a list of rejected gifts associated with the recipient.

13. A non-transitory computer readable medium storing code that when executed causes a processor to perform operations, the operations comprising:
   receiving a recipient profile associated with a recipient of a gift selected by an online shopper via a computer network;
   deriving, from the recipient profile, a list of devices associated with the recipient;
   comparing the gift to the list of devices associated with the recipient;
   determining the gift fails to match information associated with the list of devices;
   predicting a refection of the gift in response to a failure of the match;
   prompting the recipient for an in lieu gift from a wish list in lieu of the gift selected by the online shopper;
   receiving a reply from the recipient that rejects the gift selected by the online shopper and instead requests the in lieu gift from the wish list;
   retrieving the wish list from the recipient profile that specifies potential gifts selected by the recipient;
   displaying the wish list to the recipient;
   receiving a selection from the recipient of the in lieu gift from the wish list; and
   processing an order for the in lieu gift in lieu of the gift selected by the online shopper.

14. The non-transitory computer readable medium according to claim 13, wherein the operations further comprise informing a cellular telephone number that the in lieu gift has been ordered for the recipient.

15. The non-transitory computer readable medium according to claim 13, wherein the operations further comprise adding the gift to a list of rejected gifts associated with the recipient.

16. A system for facilitating online gift shopping, comprising:
   a processor; and
   a memory storing code stored that when executed causes the processor to perform operations, the operations comprising:
   receiving a recipient profile associated with a recipient of a gift selected by an online shopper via a computer network, the recipient identified by a cellular telephone number;
   deriving, from the recipient profile, a list of devices associated with the recipient;
   comparing the gift selected by the online shopper to the list of devices associated with the recipient;
   determining the gift fails to match information associated with the list of devices;
   predicting a rejection of the gift in response to the gift failing to match the information associated with the list of devices;
   retrieving a wish list in response to the rejection, the wish list specifying potential gifts selected by the recipient;
   sending a message to the cellular telephone number requesting selection of an in lieu gift from the wish list in lieu of the gift selected by the online shopper;
   receiving a reply from the cellular telephone number, the reply rejecting the gift selected by the online shopper and instead requesting the in lieu gift from the wish list; and
   sending a gift notice to the cellular telephone number to inform the recipient that the in lieu gift has been ordered for the recipient.

17. The system of claim 16, wherein the operations further comprise adding the gift to a list of rejected gifts associated with the recipient.

18. The system of claim 16, wherein the operations further comprise processing the order for the in lieu gift.

* * * * *